(12) United States Patent
Choi et al.

(10) Patent No.: US 12,294,080 B2
(45) Date of Patent: May 6, 2025

(54) METHOD OF COATING SOLID ELECTROLYTE OF SOLID-STATE BATTERY AND METHOD OF MANUFACTURING ELECTRODE OF SOLID-STATE BATTERY USING THE SAME

(71) Applicants: Hyundai Motor Company, Seoul (KR); Kia Corporation, Seoul (KR)

(72) Inventors: Sun Ho Choi, Incheon (KR); Yong Jun Jang, Seongnam-Si (KR); In Woo Song, Gwacheon-Si (KR); Sang Heon Lee, Yongin-si (KR); So Young Kim, Jeongeup-Si (KR); Seong Hyeon Choi, Hwaseong-Si (KR); Mun Seok Chae, Busan (KR); Ho Cheol Shin, Seoul (KR); Sa Heum Kim, Seoul (KR); Sang Soo Lee, Goyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 104 days.

(21) Appl. No.: 18/081,393

(22) Filed: Dec. 14, 2022

(65) Prior Publication Data
US 2023/0411601 A1 Dec. 21, 2023

(30) Foreign Application Priority Data
Jun. 8, 2022 (KR) .......................... 10-2022-0069325

(51) Int. Cl.
*H01M 4/36* (2006.01)
*H01M 4/04* (2006.01)
*H01M 4/139* (2010.01)
*H01M 4/62* (2006.01)
*H01M 10/0562* (2010.01)

(52) U.S. Cl.
CPC .......... *H01M 4/366* (2013.01); *H01M 4/0404* (2013.01); *H01M 4/139* (2013.01); *H01M 4/62* (2013.01); *H01M 10/0562* (2013.01); *H01M 2300/008* (2013.01)

(58) Field of Classification Search
CPC .... H01M 4/366; H01M 4/0404; H01M 4/139; H01M 4/62
See application file for complete search history.

(56) References Cited

U.S. PATENT DOCUMENTS

| | | | |
|---|---|---|---|
| 9,865,873 B2* | 1/2018 | Nagata | H01M 4/5815 |
| 10,056,610 B2* | 8/2018 | Nakayama | H01M 4/485 |
| 2015/0340681 A1* | 11/2015 | Iwasaki | H01M 4/5815 427/58 |
| 2021/0344004 A1* | 11/2021 | Liu | H01M 4/525 |

* cited by examiner

*Primary Examiner* — Michael P Wieczorek
(74) *Attorney, Agent, or Firm* — Banner & Witcoff, Ltd.

(57) ABSTRACT

Disclosed is a method of coating a solid electrolyte of a solid-state battery. The method includes putting an electrode active material and a sulfide-based solid electrolyte into a rotating mixer, operating the rotating mixer to rotate in a first direction while the rotating mixer revolves in a second direction, and coating a surface of the electrode active material with the sulfide-based solid electrolyte in the rotating mixer during the operation of the rotating mixer, to form a solid electrolyte layer on the surface of the electrode active material.

16 Claims, 4 Drawing Sheets

METHOD OF COATING SOLID ELECTROLYTE OF SOLID-STATE BATTERY AND METHOD OF MANUFACTURING ELECTRODE OF SOLID-STATE BATTERY USING THE SAME

CROSS-REFERENCE TO RELATED APPLICATION

This application claims under 35 U.S.C. § 119(a) the benefit of priority to Korean Patent Application No. 10-2022-0069325 filed on Jun. 8, 2022, the entire contents of which are incorporated herein by reference.

BACKGROUND

In general, a solid-state battery is a secondary battery including a solid electrolyte between a cathode and an anode.

Since electrode active materials forming the electrodes, the solid electrolyte, and conductive materials of the solid-state battery are solid, interfacial contact between the electrode active materials and the solid electrolyte may not be uniform, and thus, solid-state battery cells may have characteristics which are remarkably reduced compared to other commercial secondary battery cells.

To improve interfacial contact between the electrode active materials and the solid electrolyte, a method of coating the surface of an electrode active material with a solid electrolyte may be used. In such a coating method, the electrode active material and the solid electrolyte may be put into a solvent so as to be completely dissolved in the solvent, and a solid electrolyte layer may be formed on the surface of the electrode active material through drying, thereby increasing a contact area between the electrode active material and the solid electrolyte.

However, in order to completely dissolve the solid electrolyte in the solvent, an organic solvent having high reactivity may be used, and thereby, the solid electrolyte layer may include a large amount of impurities and thus has low ionic conductivity. If the ionic conductivity of the solid electrolyte layer is low, the discharge rate of solid-state battery cells may be reduced.

The above information disclosed in this Background section is only for enhancement of understanding of the background of the disclosure and therefore it may contain information that does not form the prior art that is already known to a person of ordinary skill in the art.

SUMMARY

The present disclosure has been made in an effort to solve the above-described problems, and it is an object of the present disclosure to provide a method of coating a solid electrolyte of a solid-state battery which may uniformly form a solid electrolyte layer having high ionic conductivity on the surface of an electrode active material, and a method of manufacturing an electrode of a solid-state battery using the same.

A method of coating a solid electrolyte of a solid-state battery may include putting an electrode active material and a sulfide-based solid electrolyte into a rotating mixer, operating the rotating mixer so as to be rotated in a first direction and to be revolved in a second direction, simultaneously, and coating a surface of the electrode active material with the sulfide-based solid electrolyte in the rotating mixer during the operation of the rotating mixer, so as to form a solid electrolyte layer on the surface of the electrode active material.

The first direction may be an opposite direction to the second direction.

A centrifugal acceleration of the rotating mixer generated by the operation of the rotating mixer may be 200 g to 460 g.

In putting the electrode active material and the sulfide-based solid electrolyte into the rotating mixer, about 1 to about 10 parts by weight of the sulfide-based solid electrolyte may be put into the rotating mixer per about 100 parts by weight of the electrode active material.

The sulfide-based solid electrolyte may be a mixture including two or more selected from the group consisting of lithium (Li), phosphorus (P), sulfur (S) and halogen elements, or a compound including two or more selected from the group consisting of lithium (Li), phosphorus (P), sulfur (S) and halogen elements.

The electrode active material may have a strength of about 100 MPa to about 300 MPa.

A method of manufacturing an electrode of a solid-state battery may include putting an electrode active material and a sulfide-based solid electrolyte into a rotating mixer, operating the rotating mixer so as to be rotated in a first direction and to be revolved in a second direction, simultaneously, coating a surface of the electrode active material with the sulfide-based solid electrolyte in the rotating mixer during the operation of the rotating mixer, so as to form a solid electrolyte layer on the surface of the electrode active material, preparing an electrode slurry by additionally putting a solvent, a sulfide-based solid electrolyte, a conductive material and a binder into the rotating mixer, and manufacturing the electrode by coating an electrode current collector with the electrode slurry.

Other aspects and examples of the present disclosure are described below.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Specific structural or functional descriptions in embodiment(s) of the present disclosure set forth in the description which follows will be exemplarily given to describe various features of the present disclosure, and the embodiment(s) of the present disclosure may be implemented in various different forms. The shapes of elements given in the drawings are merely exemplary, and may thus differ from the actual shapes thereof.

In the following description, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Further, in the following description, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

The present disclosure relates to a method of coating a solid electrolyte of a solid-state battery which enables a solid electrolyte having high ionic conductivity to be uniformly formed on the entire surface of an electrode active material without using a solvent, and a method of manufacturing an electrode of a solid-state battery using the same.

In the present disclosure, the surface of the electrode active material is coated with the solid electrolyte through dry mixing without using any solvent. Thereby, the solid electrolyte layer having high ionic conductivity is formed without impurities.

The surface of the electrode active material may be coated with the solid electrolyte using a rotating mixer which performs rotation and revolution. Here, as the rotating mixer rotates about the central axis thereof and simultaneously revolves in the opposite direction to the direction of rotation thereof, a sulfide-based solid electrolyte having ductility may be uniformly coated on the surface of the electrode active material, and further, crushing (breakage) of the electrode active material may not occur.

Shear stress may be applied to the sulfide-based solid electrolyte through the rotating mixer which rotates and revolves in different directions, and thus, the solid electrolyte layer may be uniformly formed on the surface of the electrode active material.

Figure 1A:
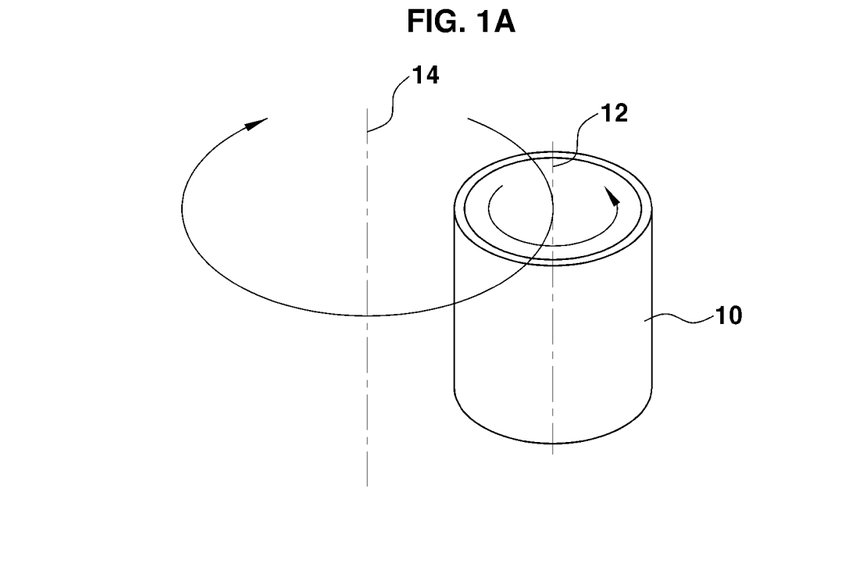
FIGS. 1A and 1B are views schematically showing the operation method of a rotating mixer used to coat the surface of an electrode active material with a solid electrolyte.
Figure 1B:
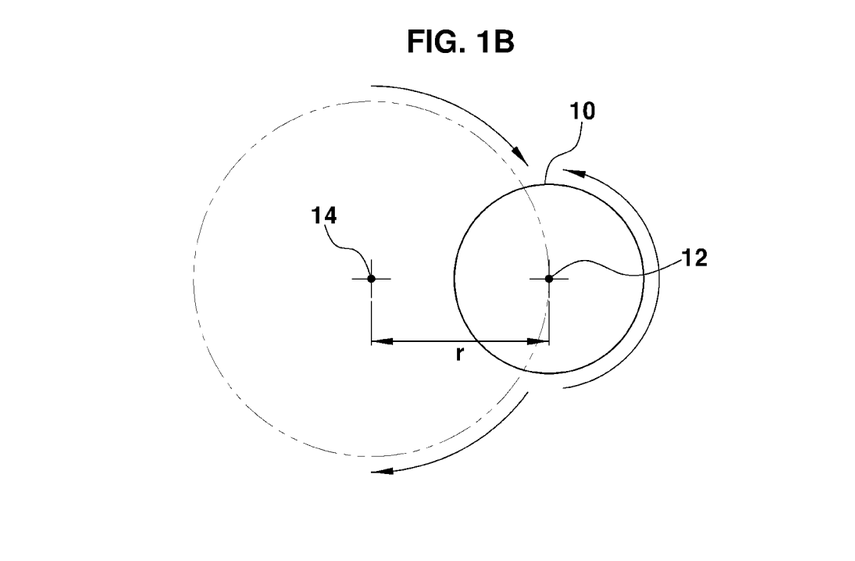

FIGS. 1A and 1B are views schematically showing the operation method of a rotating mixer used to coat the surface of an electrode active material with a solid electrolyte.

As shown in FIGS. 1A and 1B, a rotating mixer 10 may be configured to rotate about a central axis thereof (i.e., a first rotation axis 12), and may be configured to revolve around a predetermined second rotation axis 14. The rotating mixer 10 may rotate about the first rotation axis 12, and may revolve around the second rotation axis 14, simultaneously. The rotating mixer 10 may be spaced apart from the second rotation axis 14 by a predetermined distance r, and may revolve around the second rotation axis 14. Here, the distance r is a distance between the first rotation axis 12 and the second rotation axis 14. The distance r may be a revolving radius (e.g., a radius of gyration) of the rotating mixer 10. The first rotation axis 12 may be referred to as the rotational axis of the rotating mixer 10, and the second rotation axis 14 may be referred to as the orbital axis of the rotating mixer 10.

The rotating mixer 10 may rotate about the first rotation axis 12 (i.e., rotate about the central axis thereof) in a first direction, and may revolve along the circumference the second rotation axis 14 (i.e., revolve around the second rotation axis 14) in a second direction. The first direction and the second direction may be opposite directions to each other. For example, the first direction may be the clockwise direction, and the second direction may be the counterclockwise direction (or vice versa).

Figure 2:
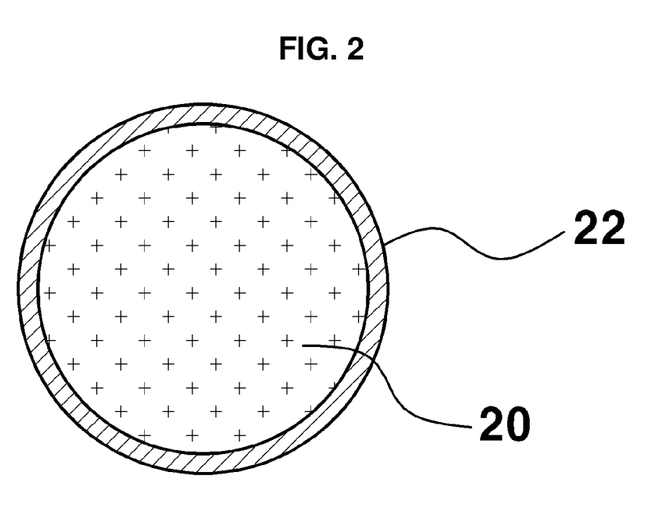
FIG. 2 is a view schematically showing a solid electrolyte layer formed on the surface of an electrolyte active material using a method of coating a solid electrolyte of an solid-state battery.

FIG. 2 is a view schematically showing a solid electrolyte layer formed on the surface of an electrolyte active material using a method of coating a solid electrolyte of an solid-state battery. If the surface of the electrode active material is coated with the solid electrolyte using the rotating mixer 10, a solid electrolyte layer 22 may be uniformly formed on the surface of an electrode active material 20, as shown in FIG. 2. The electrode active material 20 and the solid electrolyte layer 22 may form a uniform core-shell structure, and thus, breakage of the electrode active material 20 may not occur.

Figure 3:
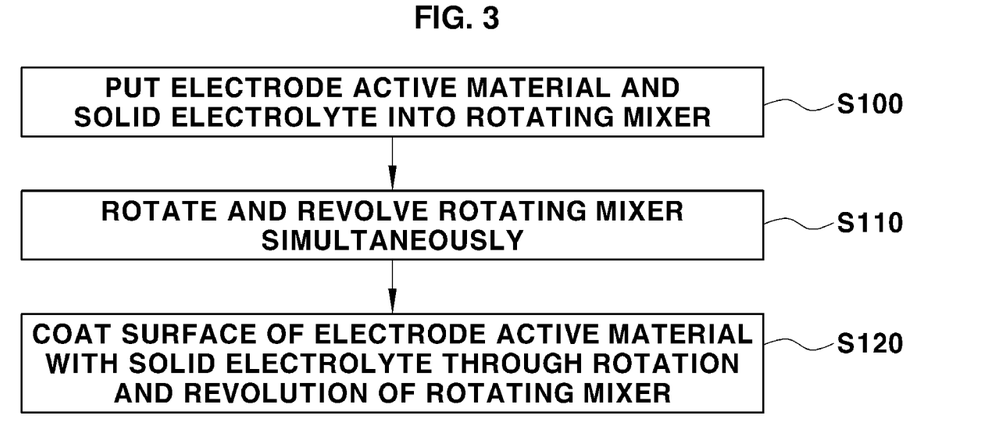
FIG. 3 is a flowchart representing a method of coating a solid electrolyte of a solid-state battery.
Figure 4:
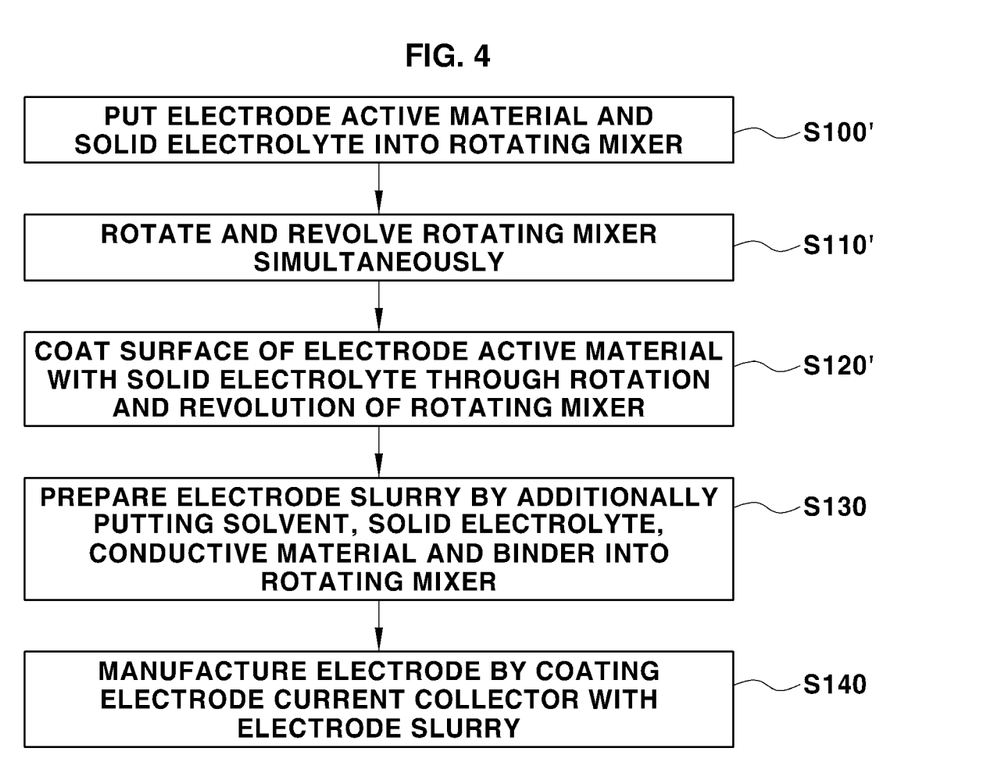
FIG. 4 is a flowchart representing a method of manufacturing an electrode using a method of coating a solid electrolyte of a solid-state battery.

FIG. 3 is a flowchart representing a method of coating a solid electrolyte of a solid-state battery, and FIG. 4 is a flowchart representing a method of manufacturing an electrode using a method of coating a solid electrolyte of an solid-state battery.

As shown in FIG. 3, a method of coating a solid electrolyte of an solid-state battery may include putting an electrode active material and a sulfide-based solid electrolyte into the rotating mixer 10 (S100), operating the rotating mixer 10 to rotate in the first direction and to revolve in the second direction, simultaneously (S110), and coating the surface of the electrode active material with the sulfide-based solid electrolyte during the rotation and revolution of the rotating mixer 10, so as to form a solid electrolyte layer on the surface of the electrode active material (S120).

The "operation" of the rotating mixer 10 may include driving of the rotating mixer 10 to rotate in the first direction and to revolve in the second direction, simultaneously.

The sulfide-based solid electrolyte placed in the rotating mixer 10 may be uniformly coated on the entire surface of the electrode active material due to centrifugal acceleration and shear stress generated by the rotating mixer 10 during the operation of the rotating mixer 10. The centrifugal acceleration may be referred to as Relative Centrifugal Force (RCF).

In order to uniformly coat the surface of the electrode active material with the solid electrolyte, the rotating mixer 10 may be operated a predetermined number of times for a predetermined time. For example, the rotating mixer 10 may repeat operation for about 2 to about 5 minutes each about 12 to about 15 times.

The centrifugal acceleration may be determined by the revolving speed and the revolving radius (i.e., the orbital radius) of the rotating mixer 10. The centrifugal acceleration may be calculated by Equation 1 below.

$$\text{Centrifugal Acceleration} = 1.12 \times r \times (\text{RPM}/1000)^2 \quad \text{[Equation 1]}$$

Here, r indicates the revolving radius of the rotating mixer 10, and RPM indicates the revolving speed of the rotating mixer 10. Referring to FIGS. 1A and 1B, the revolving radius may be a distance between the first rotation axis 12 which is the center of rotation of the rotating mixer 10 and the second rotation axis 14 which is the center of revolution of the rotating mixer 10.

The centrifugal acceleration generated during operation of the rotating mixer may be set to about 200 g to about 460 g. That is, the centrifugal acceleration is set to about 200 g to about 460 g. If the centrifugal acceleration of the rotating mixer is less than about 200 g, the solid electrolyte may not be uniformly coated on the surface of the electrode active material 20 and may be coagulated, and the solid electrolyte layer 22 which is nonuniformly formed may cause degradation of solid-state battery cells. If the centrifugal acceleration of the rotating mixer 10 exceeds about 460 g, the solid electrolyte may not be uniformly coated on the surface of the electrode active material 20.

In order to generate the centrifugal acceleration of the rotating mixer 10 which is within the range of about 200 g to about 460 g, the revolving speed of the rotating mixer 10 may be set to about 1500 RPM to about 2000 RPM, and the revolving radius of the rotating mixer 10 may be set to about 85 mm to about 100 mm.

Although the centrifugal acceleration of the rotating mixer 10 is about 200 g to about 460 g, when the revolving speed of the rotating mixer 10 is less than about 1500 RPM, the solid electrolyte layer 22 may be nonuniformly formed, and, when the revolving speed of the rotating mixer 10 exceeds 2000 about RPM, the solid electrolyte layer 22 may also be nonuniformly formed. If the revolving radius of the rotating mixer 10 is less than about 85 mm, shear stress may be insufficient and thus the solid electrolyte layer 22 may not be formed smoothly, and, if the revolving radius of the rotating mixer 10 exceeds about 100 mm, the solid electrolyte layer 22 may be nonuniformly formed.

If the centrifugal acceleration of the rotating mixer 10 is about 200 g to about 460 g, shear stress of about 0.10 MPa to about 0.25 MPa may be applied to the second rotation axis 14. If the rotating mixer 10 is operated, in order to apply shear stress of about 0.10 MPa to about 0.25 MPa to the second rotation axis 14, the centrifugal acceleration of the rotating mixer 10 may be set to about 200 g to about 460 g.

If shear stress is applied to the second rotation axis 14, the shear stress may also be applied to the solid electrolyte in the rotating mixer 10. If the shear stress applied to the second rotation axis 14 is about 0.10 MPa to about 0.25 MPa, the solid electrolyte in the rotating mixer 10 may be uniformly coated on the surface of the electrode active material due to ductility of the solid electrolyte.

The shear stress applied to the second rotation axis 14 may be calculated based on the revolving speed and the revolving radius of the rotating mixer 10. For example, the shear stress applied to the second rotation axis 14 may be calculated by Equation 2 below.

$$\tau(MPa) = \frac{60 \times P}{125 \times \pi^2 \times D^3 \times N}$$ [Equation 2]

Here, $\tau$ indicates shear stress (MPa), D indicates the revolving diameter (m) of the rotating mixer 10, N indicates the revolving speed (RPM) of the rotating mixer and P indicates power (kW) supplied to the rotating mixer 10 to operate the rotating mixer 10.

If the rotating mixer 10 is operated, the rotating speed of the rotating mixer 10 may be set to about 1500 RPM to about 2000 RPM. If the rotating speed of the rotating mixer 10 is less than about 1500 RPM, the solid electrolyte layer 22 may be nonuniformly formed, and, if the rotating speed of the rotating mixer 10 exceeds about 2000 RPM, the solid electrolyte layer 22 may also be nonuniformly formed.

About 1 to about 10 parts by weight of the sulfide-based solid electrolyte may be put into the rotating mixer 10 per about 100 parts by weight of the electrode active material put into the rotating mixer 10. The content of the sulfide-based solid electrolyte used to coat the surface of the electrode active material may be about 1 to about 10 parts by weight per about 100 parts by weight of the electrode active material.

If the content of the solid electrolyte is less than about 1 part by weight, the solid electrolyte layer 22 may be formed to have an excessively small thickness. If the content of the solid electrolyte exceeds about 10 parts by weight, the solid electrolyte layer 22 may have an excessively large thickness and may thus serve as a resistive layer, or may not have a uniform thickness.

As the sulfide-based solid electrolyte coated on the surface of the electrode active material in the rotating mixer 10, a sulfide-based solid electrolyte having ductility may be used. For example, a mixture including two or more selected from the group consisting of lithium (Li), phosphorus (P), sulfur (S) and halogen elements, or a compound including two or more selected from the above-described group may be used as the sulfide-based solid electrolyte.

As the sulfide-based solid electrolyte coated on the surface of the electrode active material, $Li_{7-x}PCh_{6-x}Ha_x$, called Li-argyrodite, may be used. In $Li_{7-x}PCh_{6-x}Ha_x$, a chalcogenide (Ch) may be substituted by sulfur (S), a halogen element (Ha) may be any one of chloride (Cl), bromine (Br), and iodine (I), and x may be set to a value which is greater than 0 but is less than or equal to 1.8. For example, $Li_6PS_5Cl$ may be used as the sulfide-based solid electrolyte.

To prevent the electrode active material from being broken during the operation of the rotating mixer 10, a material having a designated strength may be used as the electrode active material. For example, a material having a strength of about 100 MPa to about 300 MPa may be used as the electrode active material. For example, a nickel-cobalt-manganese (NCM)-based material may be used as the electrode active material.

As the electrode active material, different types of electrode active materials may be used depending on polarity. For example, if the electrode active material is an anode active material, a carbon material, such as natural graphite, artificial graphite, graphite carbon fiber or resin-baked carbon, or an alloy material combined with a solid electrolyte may be used as the anode active material. The alloy material may include a lithium alloy, such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$ or $LiC_6$, a metal oxide, such as a lithium titanate ($Li_4Ti_5O_{12}$), or a metal, such as Zn.

If the electrode active material is a cathode active material, an oxide active material or a sulfide active material may be used as the cathode active material. The oxide active material may be a rock salt layer-type active material, such as $LiCoO_2$, $LiMnO_2$, $LiNiO_2$, $LiVO_2$, $Li_{1+x}Ni_{1/3}Co_{1/3}Mn_{1/3}O_2$ or $LiNi_{1-x-y}Co_yO_2$ (NMC), a spinel-type active material, such as $LiMn_2O_4$ or $Li(Ni_{0.5}Mn_{1.5})O_4$, an inverted spinel-type active material, such as $LiNiVO_4$ or $LiCoVO_4$, an olivine-type active material, such as $LiFePO_4$, $LiMnPO_4$, $LiCoPO_4$ or $LiNiPO_4$, a silicon-containing active material, such as $Li_2FeSiO_4$ or $Li_2MnSiO_4$, a rock salt layer-type active material in which a part of a transition metal is substituted with a different type of metal, such as $LiNi_{0.8}Co_{(0.2-x)}Al_xO_2$ (0<x<0.2), a spinel-type active material in which a part of a transition metal is substituted with a different type of metal, such as $Li_{1+x}Mn_{2-x-y}M_yO_4$ (M being at least one of Al, Mg, Co, Fe, Ni or Zn, and 0<x+y<2), or a lithium titanate, such as $Li_4Ti_5O_{12}$. Further, the sulfide active material may be copper Chevrel, iron sulfide, cobalt sulfide, or nickel sulfide.

In the case in which the solid electrolyte layer 22 is formed on the surface of the electrode active material 20 using the above-described method, dissolution and deposition processes of the solid electrolyte may be omitted, and thus, side reactions between the electrode active material 20 and the solid electrolyte may be prevented, and a processing time to form the solid electrolyte layer 22 may be shortened.

An electrode of a solid-state battery may be manufactured using the above-described method.

As shown in FIG. 4, a method of manufacturing the electrode of the solid-state battery using the above described method may include putting the electrode active material and the sulfide-based solid electrolyte into the rotating mixer 10 (S100'), operating the rotating mixer to rotate in the first direction and to revolve in the second direction, simultaneously (S110'), coating the surface of the electrode active material with the sulfide-based solid electrolyte during rotation and revolution of the rotating mixer 10, to form the solid electrolyte layer on the surface of the electrode active material (S120'), preparing an electrode slurry by additionally putting a solvent, a sulfide-based solid electrolyte, a conductive material and a binder into the rotating mixer 10 and mixing all the elements (S130), and manufacturing the electrode by coating an electrode current collector with the electrode slurry (S140).

The sulfide-based solid electrolyte additionally put into the rotating mixer 10 in the preparation of the electrode slurry (S130) may be the same as the solid electrolyte coated on the surface of the electrode active material.

The solvent, the conductive material, and the binder may include materials which are generally used to manufacture electrodes for solid-state batteries. For example, the solvent may include one selected from the group consisting of xylene, heptane and toluene, and is not limited to a material including a specific component in the present disclosure. The conductive material may include one selected from the group consisting of carbon black, conductive graphite, ethylene black and graphene, and is not limited to a material including a specific component in the present disclosure. The binder may include polytetrafluoroethylene (PTFE), and is not limited to a material including a specific component in the present disclosure. As the electrode current collector, a general electrode current collector used to manufacture electrodes for solid-state batteries may be used.

The manufacture of the electrode (S140) may include coating at least one surface of the electrode current collector with the electrode slurry, and drying the electrode slurry coated on the electrode current collector by heating, to remove the solvent from the electrode slurry and thus to manufacture the electrode.

Through the above-described method, a cathode and an anode for solid-state batteries may be manufactured. A solid-state battery cell may be manufactured using the cathode and/or the anode manufactured through the above-described method.

Through the method of coating the solid electrolyte of the solid-state battery described herein, impurities may be removed from the solid electrolyte layer coated on the surface of the active material, and thus, the solid electrolyte layer which maintains the original ionic conductivity of the sulfide-based solid electrolyte layer may be formed on the surface of the electrode active material.

Through the method described herein, the solid electrolyte layer may be uniformly formed on the entire surface of the electrode active material without causing breakage of the electrode active material.

Therefore, if an electrode of a solid-state battery is manufactured using the method described herein and a solid-state battery cell is manufactured using the electrode, the characteristics of the solid-state battery cell can be improved. For example, charge and discharge characteristics of the solid-state battery cell can be improved.

Hereinafter, various examples of the present disclosure will be described in more detail through the following examples. The following examples serve to describe example features, and are not intended to limit the scope of the disclosure.

Example 1

Manufacture of Electrode Active Material Coated with Solid Electrolyte Layer

After about 5 g of NCM711 as a cathode active material and about 0.1 g of $Li_6PS_5Cl$ as a sulfide-based solid electrolyte were put into a rotating mixer so as to be mixed, the rotating mixer was repeatedly rotated in the counterclockwise direction and revolved in the clockwise direction simultaneously for about 3 minutes each 15 times. The centrifugal acceleration of the rotating mixer was about 420 g, and shear stress applied to the orbital axis of the rotating mixer was about 0.240 MPa. A $Li_6PS_5Cl$ layer was formed by uniformly coating the surface of NCM711 with $Li_6PS_5Cl$ through the above operation of the rotating mixer. NCM711 is a material in which nickel, cobalt and manganese are mixed at a ratio of about 7:1:1.

Manufacture of Electrode for Solid-State Batteries and Manufacture of Solid-State Battery Cell An electrode slurry was prepared by additionally putting xylene as a solvent, about 1.15 g of $Li_6PS_5Cl$ as a sulfide-based solid electrolyte, about 0.1 g of super carbon as a conductive material, and about 2.5 g of polytetrafluoroethylene (PTFE) as a binder into the rotating mixer, in which about 5.1 g of NCM711 having the $Li_6PS_5Cl$ layer was placed, and then the rotating mixer was rotated in the counterclockwise direction and revolved in the clockwise direction, simultaneously, for about 15 minutes. A cathode for solid-state batteries was manufactured by coating the surface of an electrode current collector with the electrode slurry and then removing the solvent by heating. The centrifugal acceleration of the rotating mixer was about 420 g.

A solid-state battery cell was manufactured by putting the above-manufactured cathode, $Li_6PS_5Cl$ used as a solid electrolyte, and lithium used as an anode into a mold for manufacturing battery cells and then pressing the same at a pressure of 45 MPa.

Example 2

Manufacture of Electrode Active Material Coated with Solid Electrolyte Layer

NCM711 having a $Li_6PS_5Cl$ layer was manufactured under the same conditions as in Example 1 except for the centrifugal acceleration of the rotating mixer. Here, the centrifugal acceleration of the rotating mixer was about 200 g, and shear stress applied to the orbital axis of the rotating mixer was about 0.187 MPa.

Manufacture of Electrode for Solid-State Batteries and Manufacture of Solid-State Battery Cell A cathode for solid-state batteries and a solid-state battery cell were manufactured under the same conditions as in Example 1 except for the centrifugal acceleration of the rotating mixer and NCM711 having the $Li_6PS_5Cl$ layer. The centrifugal acceleration of the rotating mixer was about 200 g, and NCM711 having the $Li_6PS_5Cl$ layer manufactured in Example 2 was used.

Example 3

Manufacture of Electrode Active Material Coated with Solid Electrolyte Layer

NCM711 having a $Li_6PS_5Cl$ layer was manufactured under the same conditions as in Example 1 except for the centrifugal acceleration of the rotating mixer. Here, the centrifugal acceleration of the rotating mixer was about 300 g, and shear stress applied to the orbital axis of the rotating mixer was about 0.202 MPa.

Manufacture of Electrode for Solid-State Batteries and Manufacture of Solid-State Battery Cell A cathode for solid-state batteries and a solid-state battery cell were manufactured under the same conditions as in Example 1 except for the centrifugal acceleration of the rotating mixer and NCM711 having the $Li_6PS_5Cl$ layer. The centrifugal acceleration of the rotating mixer was about 300 g, and NCM711 having the $Li_6PS_5Cl$ layer manufactured in Example 3 was used.

Example 4

Manufacture of Electrode Active Material Coated with Solid Electrolyte Layer

NCM711 having a $Li_6PS_5Cl$ layer was manufactured under the same conditions as in Example 1 except for the centrifugal acceleration of the rotating mixer. Here, the centrifugal acceleration of the rotating mixer was about 460 g, and shear stress applied to the orbital axis of the rotating mixer was about 0.249 MPa.

Manufacture of Electrode for Solid-State Batteries and Manufacture of Solid-State Battery Cell A cathode for solid-state batteries and a solid-state battery cell were manufactured under the same conditions as in Example 1 except for the centrifugal acceleration of the rotating mixer and NCM711 having the $Li_6PS_5Cl$ layer. The centrifugal acceleration of the rotating mixer was about 460 g, and NCM711 having the $Li_6PS_5Cl$ layer manufactured in Example 4 was used.

Comparative Example 1

Manufacture of Electrode Active Material Coated with Solid Electrolyte Layer

NCM711 having a $Li_6PS_5Cl$ layer was manufactured under the same conditions as in Example 1 except that the rotating mixer were rotated and revolved in the same direction. Here, the rotating mixer was rotated in the clockwise direction and was revolved in the clockwise direction, simultaneously.

Manufacture of Electrode for Solid-State Batteries and Manufacture of Solid-State Battery Cell A cathode for solid-state batteries and a solid-state battery cell were manufactured under the same conditions as in Example 1 except that NCM711 having the $Li_6PS_5Cl$ layer manufactured in Comparative Example 1 was used.

Comparative Example 2

Manufacture of Electrode Active Material Coated with Solid Electrolyte Layer

After a mixed solution was prepared by putting about 5 g of NCM711 as a cathode active material and about 0.1 g of $Li_6PS_5Cl$ as a solid electrolyte into xylene as an organic solvent and completely dissolving NCM711 and $Li_6PS_5Cl$ in the solvent, the mixed solution was agitated at about 265 RPM for about 3 minutes when the mixed solution was heated at a rate of about 1° C./min and thus reached a temperature of about 50° C. A $Li_6PS_5Cl$ layer was formed on the surface of NCM711 through precipitation of $Li_6PS_5Cl$ during agitation of the mixed solution.

Manufacture of Electrode for Solid-State Batteries and Manufacture of Solid-State Battery Cell An electrode slurry was prepared by putting about 5.1 g of NCM711 having the $Li_6PS_5Cl$ layer manufactured in Comparative Example 2, about 1.15 g of $Li_6PS_5Cl$ as a solid electrolyte, about 0.1 g of super carbon as a conductive material, about 2.5 g of polytetrafluoroethylene (PTFE) as a binder, and xylene as a solvent into the rotating mixer, and then agitating the mixture for 14 hours. A cathode for solid-state batteries was manufactured by vacuum-drying the electrode slurry at a temperature of about 150° C. for about 1 hour 30 minutes.

Subsequently, a solid-state battery cell was manufactured by putting the above-manufactured cathode, $Li_6PS_5Cl$ used as a solid electrolyte, and lithium used as an anode into the mold for manufacturing battery cells and then pressing the same at a pressure of about 45 MPa.

Comparative Example 3

Manufacture of Electrode for Solid-State Batteries and Manufacture of Solid-State Battery Cell An electrode slurry was prepared by putting about 5 g of NCM711 as a cathode active material, about 1.25 g of $Li_6PS_5Cl$ as a solid electrolyte, about 0.1 g of super carbon as a conductive material, about 2.5 g of polytetrafluoroethylene (PTFE) as a binder, and xylene as a solvent into the rotating mixer, and then agitating the mixture for about 14 hours, and a cathode for solid-state batteries was manufactured by vacuum-drying the electrode slurry at a temperature of about 150° C. for about 1 hour 30 minutes.

Subsequently, a solid-state battery cell was manufactured by putting the above-manufactured cathode, $Li_6PS_5Cl$ used as a solid electrolyte, and lithium used as an anode into the mold for manufacturing battery cells and then pressing the same at a pressure of about 45 MPa.

Comparative Example 4

Manufacture of Electrode Active Material Coated with Solid Electrolyte Layer

NCM711 having a $Li_6PS_5Cl$ layer was manufactured under the same conditions as in Example 1 except for the centrifugal acceleration of the rotating mixer. The centrifugal acceleration of the rotating mixer was about 100 g, and shear stress applied to the orbital axis of the rotating mixer was about 0.115 MPa.

Manufacture of Electrode for Solid-State Batteries and Manufacture of Solid-State Battery Cell A cathode for solid-state batteries and a solid-state battery cell were manufactured under the same conditions as in Example 1 except for the centrifugal acceleration of the rotating mixer and NCM711 having the $Li_6PS_5Cl$ layer. The centrifugal acceleration of the rotating mixer was about 100 g, and NCM711 having the $Li_6PS_5Cl$ layer manufactured in Comparative Example 4 was used.

Comparative Example 5

Manufacture of Electrode Active Material Coated with Solid Electrolyte Layer

NCM711 having a $Li_6PS_5Cl$ layer was manufactured under the same conditions as in Example 1 except for the centrifugal acceleration of the rotating mixer. The centrifugal acceleration of the rotating mixer was about 480 g, and shear stress applied to the orbital axis of the rotating mixer was about 0.258 MPa.

Manufacture of Electrode for Solid-State Batteries and Manufacture of Solid-State Battery Cell A cathode for solid-state batteries and a solid-state battery cell were manufactured under the same conditions as in Example 1 except for the centrifugal acceleration of the rotating mixer and NCM711 having the $Li_6PS_5Cl$ layer. The centrifugal acceleration of the rotating mixer was about 480 g, and NCM711 having the $Li_6PS_5Cl$ layer manufactured in Comparative Example 5 was used.

TABLE 1

| | Solvent | Centrifugal acceleration [g] | Shear stress [MPa] | Discharge rate [%] |
|---|---|---|---|---|
| Example 1 | — | 420 | 0.240 | 88.2 |
| Example 2 | — | 200 | 0.187 | 85.1 |
| Example 3 | — | 300 | 0.202 | 86.4 |
| Example 4 | — | 460 | 0.249 | 87.6 |
| Comp. Example 1 | — | 420 (rotated and revolved in same direction) | 0.240 | 83.7 |
| Comp. Example 2 | Xylene | — | — | 84.0 |
| Comp. Example 3 | — | — | — | 82.0 |
| Comp. Example 4 | — | 100 | 0.115 | 78.0 |
| Comp. Example 5 | — | 480 | 0.258 | 84.0 |

Results of calculated discharge rates (%) of the solid-state battery cells manufactured according to Examples 1 to 4 and results of calculated discharge rates (%) of the solid-state battery cells manufactured according to Comparative Examples 1 to 5 are set forth in the above Table 1.

As set forth in the above Table 1, it shows that the discharge rates (%) of the solid-state battery cells manufactured according to Examples 1 to 4 are higher than the discharge rates (%) of the solid-state battery cells manufactured according to Comparative Examples 1 to 5.

Through comparison between Example 1 and Comparative Example 1, it shows that the discharge rate (%) of the solid-state battery cell manufactured in the state in which the rotating mixer is rotated and revolved in opposite directions is much higher than the discharge rate (%) of the solid-state battery cell manufactured in the state in which the rotating mixer is rotated and revolved in the same direction. Further, although the solid-state battery cell according to Example 3 was manufactured at a lower centrifugal acceleration than the solid-state battery cell according to Comparative Example 1, it shows that the discharge rate (%) of the solid-state battery cell manufactured according to Example 3 is higher than the discharge rate (%) of the solid-state battery cell manufactured according to Comparative Example 1.

Further, the comparison between Examples 1 to 4 and Comparative Example 2 shows that the discharge rates (%) of the solid-state battery cells manufactured without using any solvent are higher than the discharge rate (%) of the solid-state battery cell manufactured using the solvent in coating of the surface of NCM711 as the electrode active material with $Li_6PS_5Cl$ as the solid electrolyte layer.

The comparison between Examples 1 to 4 and Comparative Example 3 shows that the discharge rates (%) of the solid-state battery cells in which the surface of NCM711 as the electrode active material is coated with $Li_6PS_5Cl$ as the solid electrolyte layer are higher than the discharge rate (%) of the solid-state battery cell in which the surface of NCM711 as the electrode active material is not coated with $Li_6PS_5Cl$ as the solid electrolyte layer.

Further, it shows that the discharge rates (%) of the solid-state battery cells manufactured according to Examples 1, 3 and 4 are higher than the discharge rate (%) of the solid-state battery cell manufactured according to Example 2. Particularly, the discharge rates (%) of the solid-state battery cells manufactured according to Examples 1 and 4 are higher than the discharge rate (%) of the solid-state battery cell manufactured according to Example 3. The discharge rate (%) of the solid-state battery cell manufactured according to Example 1 is also higher than the discharge rate (%) of the solid-state battery cell manufactured according to Example 4.

As is apparent from the above description, various features described in the present disclosure provide the following effects.

First, in a method of coating a solid electrolyte of a solid-state battery according to the present disclosure, the surface of an electrode active material may be uniformly coated with the solid electrolyte without using any solvent, and thus, a solid electrolyte layer may be formed on the surface of the electrode active material without impurities, thereby having increased ionic conductivity of the solid electrolyte layer.

Second, the surface of the electrode active material may be coated with the solid electrolyte using a rotating mixer which performs both rotation and revolution, and the mixer is rotated and revolved in opposite directions simultaneously so that the surface of the electrode active material may be uniformly coated with a sulfide-based solid electrolyte having ductility.

Various features of the present disclosure have been described in detail with reference to exemplary embodiment(s) thereof. However, it will be appreciated by those skilled in the art that changes may be made in these embodiment(s) without departing from the principles of the invention.

What is claimed is:

1. A method of coating a solid electrolyte of a solid-state battery, the method comprising:
    putting an electrode active material and a sulfide-based solid electrolyte into a rotating mixer;
    operating the rotating mixer to rotate in a first direction while the rotating mixer revolves in a second direction, wherein the first direction is an opposite direction to the second direction; and
    coating a surface of the electrode active material with the sulfide-based solid electrolyte in the rotating mixer during the operating the rotating mixer, to form a solid electrolyte layer on the surface of the electrode active material,
    wherein the electrode active material and the solid electrolyte layer form a uniform core-shell structure,
    wherein the rotating mixer revolves around a rotation axis,
    wherein shear stress of about 0.10 MPa to about 0.25 MPa is applied to the rotation axis, and wherein a revolving speed of the rotating mixer is set to about 1500 rpm to about 2000 rpm, and a revolving radius of the rotating mixer is set to about 85 mm to about 100 mm.

2. The method of claim 1, wherein a centrifugal acceleration of the rotating mixer generated by the operating the rotating mixer is about 200 g to about 460 g.

3. The method of claim 1, wherein, in putting the electrode active material and the sulfide-based solid electrolyte into the rotating mixer, about 1 to about 10 parts by weight of the sulfide-based solid electrolyte is put into the rotating mixer per about 100 parts by weight of the electrode active material.

4. The method of claim 1, wherein the sulfide-based solid electrolyte is:
a mixture comprising two or more selected from the group consisting of lithium (Li), phosphorus (P), sulfur(S), and halogen elements; or
a compound comprising two or more selected from the group consisting of lithium (Li), phosphorus (P), sulfur (S), and halogen elements.

5. The method of claim 1, wherein the electrode active material has a strength of about 100 MPa to about 300 MPa.

6. The method of claim 1, wherein the coating the surface of the electrode active material with the sulfide-based solid electrolyte in the rotating mixer comprises:
coating the surface of the electrode active material with the sulfide-based solid electrolyte through dry mixing without adding any solvent in the rotating mixer.

7. The method of claim 1, wherein the operating the rotating mixer comprises operating the rotating mixer to rotate around a second rotation axis while the rotating mixer revolves around the rotation axis,
wherein the rotation axis is parallel to the second rotation axis, and
wherein the rotation axis is spaced apart from the second rotation axis with a predetermined distance.

8. The method of claim 1, wherein the electrode active material comprises a nickel-cobalt-manganese-based material, and
wherein the sulfide-based solid electrolyte comprises at least one of: Li-argyrodite or $Li_6PS_5Cl$.

9. A method of manufacturing an electrode of a solid-state battery, the method comprising:
putting an electrode active material and a sulfide-based solid electrolyte into a rotating mixer;
operating the rotating mixer to rotate in a first direction while the rotating mixer revolves in a second direction, wherein the first direction is an opposite direction to the second direction;
coating a surface of the electrode active material with the sulfide-based solid electrolyte in the rotating mixer during the operating the rotating mixer, to form a solid electrolyte layer on the surface of the electrode active material;
preparing an electrode slurry by additionally putting a solvent, a sulfide-based solid electrolyte, a conductive material, and a binder into the rotating mixer; and
manufacturing the electrode by coating an electrode current collector with the electrode slurry,
wherein the electrode active material and the solid electrolyte layer form a uniform core-shell structure,
wherein the rotating mixer revolves around a rotation axis,
wherein shear stress of about 0.10 MPa to about 0.25 MPa is applied to the rotation axis, and
wherein a revolving speed of the rotating mixer is set to about 1500 rpm to about 2000 rpm, and a revolving radius of the rotating mixer is set to about 85 mm to about 100 mm.

10. The method of claim 9, wherein a centrifugal acceleration of the rotating mixer generated by the operating the rotating mixer is about 200 g to about 460 g.

11. The method of claim 9, wherein, in putting the electrode active material and the sulfide-based solid electrolyte into the rotating mixer, about 1 to about 10 parts by weight of the sulfide-based solid electrolyte is put into the rotating mixer per about 100 parts by weight of the electrode active material.

12. The method of claim 9, wherein the sulfide-based solid electrolyte is:
a mixture comprising two or more selected from the group consisting of lithium (Li), phosphorus (P), sulfur(S), and halogen elements; or
a compound comprising two or more selected from the group consisting of lithium (Li), phosphorus (P), sulfur (S), and halogen elements.

13. The method of claim 9, wherein the electrode active material has a strength of about 100 MPa to about 300 MPa.

14. The method of claim 9, wherein the coating the surface of the electrode active material with the sulfide-based solid electrolyte in the rotating mixer comprises:
coating the surface of the electrode active material with the sulfide-based solid electrolyte through dry mixing without adding any solvent in the rotating mixer.

15. The method of claim 9, wherein the operating the rotating mixer comprises operating the rotating mixer to rotate around a second rotation axis while the rotating mixer revolves around the rotation axis,
wherein the rotation axis is parallel to the second rotation axis, and
wherein the rotation axis is spaced apart from the second rotation axis with a predetermined distance.

16. The method of claim 9, wherein the electrode active material comprises a nickel-cobalt-manganese-based material, and
wherein the sulfide-based solid electrolyte comprises at least one of: Li-argyrodite or $Li_6PS_5Cl$.

\* \* \* \* \*